US008823755B2

(12) United States Patent
Smith et al.

(10) Patent No.: US 8,823,755 B2
(45) Date of Patent: Sep. 2, 2014

(54) APPARATUS AND METHOD FOR INCREASING PIXEL RESOLUTION OF IMAGE USING COHERENT SAMPLING

(71) Applicant: Mstar Semiconductor, Inc., Hsinchu Hsien (TW)

(72) Inventors: Sterling Smith, HsinChu Hsien (TW); Jiunn-Kuang Chen, Taoyuan (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/971,116

(22) Filed: Aug. 20, 2013

(65) Prior Publication Data

US 2014/0002731 A1   Jan. 2, 2014

Related U.S. Application Data

(62) Division of application No. 11/103,532, filed on Apr. 12, 2005, now Pat. No. 8,542,258.

(60) Provisional application No. 60/567,786, filed on May 5, 2004.

(51) Int. Cl.
*G09G 5/02*   (2006.01)
*G09G 5/00*   (2006.01)
*H04N 7/01*   (2006.01)

(52) U.S. Cl.
CPC ..... *H04N 7/0117* (2013.01); *G09G 2340/0407* (2013.01); *G09G 5/005* (2013.01)
USPC .............................. 345/698; 345/3.3; 345/204

(58) Field of Classification Search
USPC ................... 345/3.3, 204, 698–699
See application file for complete search history.

(56) References Cited

U.S. PATENT DOCUMENTS

| | | | |
|---|---|---|---|
| 5,227,882 A | 7/1993 | Kato | |
| 5,410,357 A | 4/1995 | Rieger et al. | |
| 5,739,867 A | 4/1998 | Eglit | |
| 5,838,381 A | 11/1998 | Kasahara et al. | |
| 5,933,196 A | 8/1999 | Hatano et al. | |
| 5,953,074 A | 9/1999 | Reddy | |
| 6,037,925 A | 3/2000 | Kim | |
| 6,067,071 A | 5/2000 | Kotha et al. | |
| 6,078,361 A | 6/2000 | Reddy | |
| 6,177,922 B1 | 1/2001 | Schiefer et al. | |
| 6,469,746 B1 | 10/2002 | Maida | |
| 6,597,370 B1 * | 7/2003 | Lee | 345/660 |
| 6,680,752 B1 | 1/2004 | Callway et al. | |
| 7,019,764 B2 | 3/2006 | Neal | |
| 2003/0184678 A1 | 10/2003 | Chen et al. | |
| 2003/0197808 A1 | 10/2003 | McIntyre | |
| 2005/0134735 A1 | 6/2005 | Swartz | |

* cited by examiner

*Primary Examiner* — Michael Pervan
(74) *Attorney, Agent, or Firm* — WPAT, PC; Justin King

(57) ABSTRACT

An apparatus and method for adjusting the pixel resolution of an input image is disclosed. According to the present invention, the pixel resolution of the input image is adjusted by oversampling an analog signal representative of the input image at a higher frequency than the pixel rate of the original image, then digitally downscaling to the desired horizontal resolution of an output image. The horizontally downscaled image is then stored in a buffer memory and subsequently scaled up to the desired vertical resolution of the output image. Preferably, oversampling of the analog signal is performed at a frequency that is an integer multiple of the input pixel rate, thus providing coherent sampling to help avoid aliasing artifacts in the sampled image.

9 Claims, 10 Drawing Sheets

APPARATUS AND METHOD FOR INCREASING PIXEL RESOLUTION OF IMAGE USING COHERENT SAMPLING

CROSS-REFERENCE TO RELATED APPLICATIONS

This application is a divisional of an U.S. application Ser. No. 11/103,532, filed on Apr. 12, 2005, now pending. This application is based upon and claims the benefit of U.S. provisional application Ser. No. 60/567,786 filed May 5, 2004, the contents of which are incorporated herein by reference.

BACKGROUND OF THE INVENTION

1. Field of the Invention

The present invention relates to a display system, and more particularly to an apparatus and method for increasing the pixel resolution of an input image using coherent sampling.

2. Description of the Related Art

Display systems are employed to process input images from one or more video source devices, like DVD player or computer etc., into output images to be displayed on a corresponding display screen of monitors or televisions. Usually, the input image is transmitted from a computer host or a video source such that the pixel resolution of the input image has been predetermined. Therefore, the display system needs a scaler to resize or scaled the predetermined pixel resolution of the input image into an appropriate pixel resolution such that the display screen can correctly display the output image. The input image signal provided by a computer is generally complying with the VESA format, a computer graphics format.

Modern video and image display devices are now often characterized by having a display panel with a fixed pixel resolution. Well-known examples are LCD monitors and LCD televisions. These modern display panels also typically accept only digital source images. Since the images or image sequences from many video sources are still transmitted from the video source device to the display device using analog signal formats the display device now requires an ADC (analog-to-digital-converter) which samples and digitizes the analog video signal input. The ADC of the conventional display controller samples the analog signal at a time interval that results in a pixel resolution at the ADC output that mirrors the native resolution of the video source. Often this pixel resolution is lower than the pixel resolution of the display panel. Directly displaying the digitized image on the output display panel would then result in an image that does not fill the entire display area, as shown in FIG. 6. Digital scaling methods are typically used to increase the resolution of the image to fit the display panel. FIG. 7 shows the typical function blocks of currently used upscaling technology.

SUMMARY OF THE INVENTION

There are several problems often associated with the currently used methods of digitizing and digital upscaling. First, the video source analog signal has timing jitter that is typically a significant fraction of a pixel period. Some of the timing jitter can be removed by carefully tracking the horizontal line frequency timing signals (HSYNC) using phase locked-loop (PLL) techniques, as shown in FIGS. 7a and 7b. However, even with a well-designed PLL 710 there may still remain significant jitter between the regenerated sampling clock (CLKADC) of PLL, as shown in FIGS. 7a and 7b, and the input video signal 102. This results in very large errors when the ADC samples the analog input signal. The resulting image quality degradation can be significant. By the judicious use of signal processing, this situation can be improved significantly if the ADC samples the input signal at a rate significantly higher than the Nyquist rate or the maximum signal transition rate. If one of these conditions is met, then the sampled input signal can be analyzed to determine the timing error present between the input signal and the sampling clock. Therefore, by further improvement of the present invention, a phase detector can be used to extract the timing error between the actual and ideal sampling points which can be used either to feedback to the PLL, as shown in FIG. 8a, to reduce the future timing error, or it can be used as to correct the sampling error by use of digital interpolation techniques, as shown in FIG. 8b. In either of these technologies the effect of the timing error can be significantly reduced. An additional benefit of digital interpolation for signal correction is that the same interpolation engine can be used to correct the frequency response impairments such as those caused by long or poor quality cables or impedance mismatches.

A side benefit of the increased sampling rate comes from the practical issues associated with signal processing and Nyquist theory. Although in theory, the Nyquist theorem states that a signal that is sampled at the Nyquist rate can be exactly reconstructed, it also requires infinitely precise filters to do so. The accuracy of sampling, digitizing, and then precisely reconstructing the image on the display panel can be increased by sampling at a higher rate than Nyquist. Also by sampling at a sufficiently high rate, the need for digital upscaling in the horizontal direction can be eliminated in order to save power and/or cost.

Therefore, an apparatus and method for adjusting the pixel resolution of an input image is provided. According to the present invention, the pixel resolution of the input image is adjusted by oversampling an analog signal representative of the input image at a higher frequency than the pixel rate of the original image, then digitally downscaling to the desired horizontal resolution of an output image. The horizontally downscaled image is then stored in a buffer memory and subsequently scaled up to the desired vertical resolution of the output image.

BRIEF DESCRIPTION OF THE DRAWINGS

Objects and advantages of the present invention will be fully understood from the detailed description to follow taken in conjunction with the embodiments as illustrated in the accompanying drawings, wherein.

DETAILED DESCRIPTION OF THE PREFERRED EMBODIMENT

Figure 9:
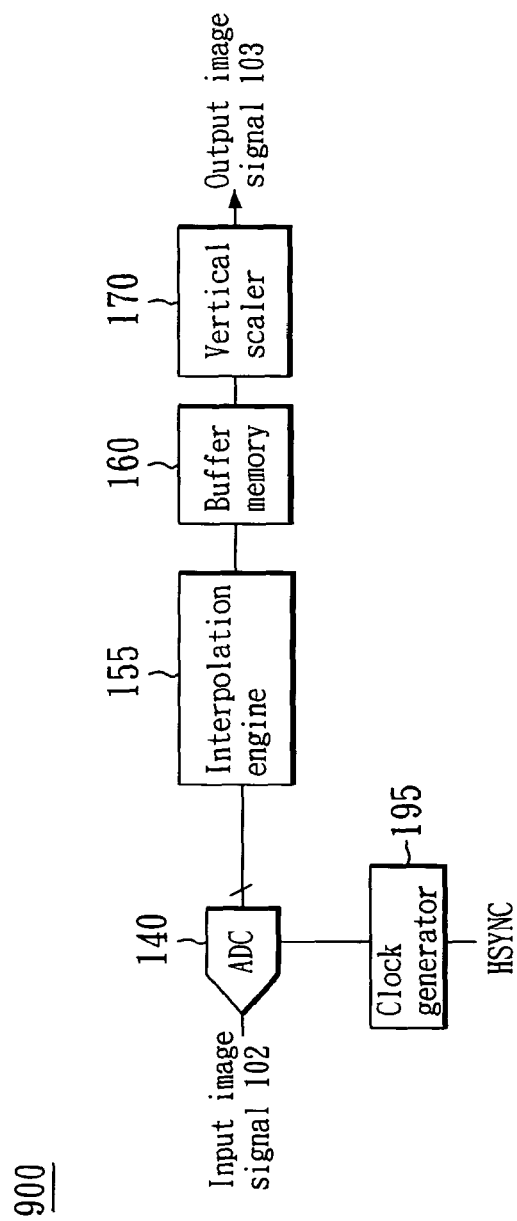
FIG. 9 depicts another schematic block diagram of an apparatus for increasing the pixel resolution of an image in accordance with the present invention

The preferred embodiment is shown in FIG. 9. Referring to FIG. 9, a block diagram of an apparatus 900 for increasing the pixel resolution of an image in accordance with the present invention is schematically illustrated. As shown in FIG. 9, the apparatus 900 comprises an analog-to-digital converter (ADC) 140, an interpolation engine 155, a buffer memory 160 and a vertical scaler 170. The apparatus 900 is utilized to process input source images signal 102 transmitted in analog format from a computer host or a video source and provide output destination images signal 103 to be displayed on a corresponding screen of monitors or televisions. The digital horizontal upscaling has been eliminated, as the ADC 140 always samples the input signal at a horizontal pixel resolution that is the same or higher than that rate used in the output image signal. The input image signal is oversampled to obtain a pixel resolution at the ADC 140 output that is an integer multiple of the source pixel resolution in order to simplify the signal processing requirements of the timing error extraction and interpolation processing. The integer multiple oversampling also significantly reduces the visual aliasing artifacts that would otherwise occur when using non-integer oversampling of a high bandwidth video source such as from a PC graphics system which contains significant harmonic energy due to the pixel-rate sample-hold style of signal reconstruction that is commonly used in such sources. This integer multiple oversampling can be also be referred to as coherent oversampling. The interpolation engine 155 can be used for correction of timing errors, frequency response correction and horizontal downscaling of the digitized pixel data to fit the horizontal pixel resolution of the output image for the display panel. After the interpolation one or more lines of pixel data are stored in a buffer memory 160. The output of the buffer memory is then used by vertical scaler 170 to vertically scale the image size up or down to fit the vertical line resolution of the output image for display panel. The scaled image data output from the vertical scaler 170 then may pass through further signal processing steps such as color enhancement, then formatted to fit the panel data format requirements and transmitted to the display panel.

Figure 1:
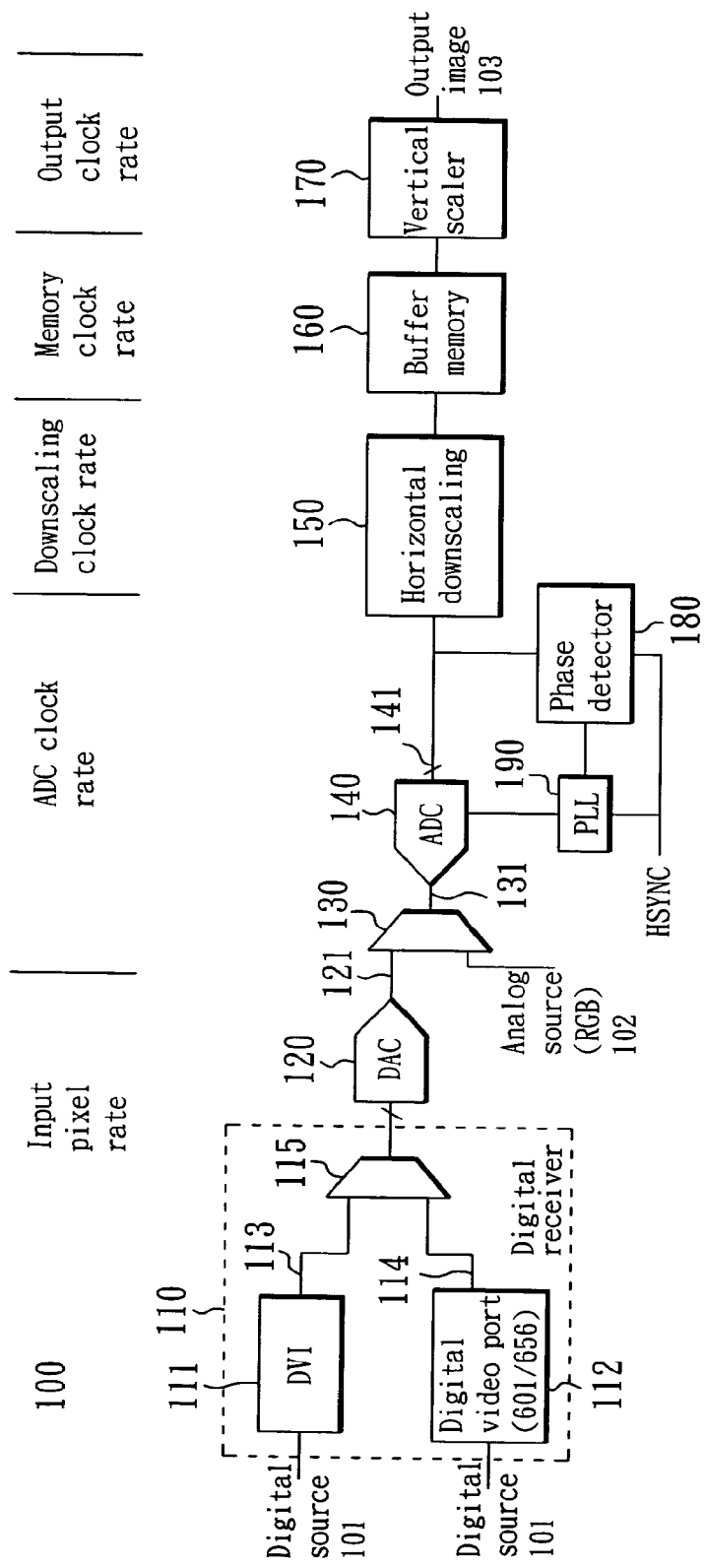
FIG. 1 depicts a schematic block diagram of an apparatus for increasing the pixel resolution of an image in accordance with the present invention.

Another preferred embodiment, referring to FIG. 1, a block diagram of an apparatus 100 for increasing the pixel resolution of an image in accordance with the present invention is schematically illustrated. As shown in FIG. 1, the apparatus 100 comprises a digital receiver 110, a digital-to-analog converter (DAC) 120, a selector 130, an analog-to-digital converter (ADC) 140, a horizontal down-scaler 150, a buffer memory 160 and a vertical scaler 170. The apparatus 100 is utilized to process input source images signal 101 or 102 transmitted in digital or analog format from a computer host or a video source and provide output destination images signal 103 to be displayed on a corresponding screen of monitors or televisions.

As shown in FIG. 1, the digital source image 101 is applied to the digital receiver 110 and then sent to the DAC 120 to be converted into a corresponding analog image 121. Preferably, the digital receiver 110 may have a Digital Visual Interface ("DVI") receiver 111 and/or a digital video port 112 to process DVI signals and video signals in digital format, respectively. A selector 115 is provided to select digital data 113 or 114 representative of the digital source image to be converted into the analog image signal 121 by the DAC 120 as mentioned above. In the preferred embodiment, the conversion rate of the DAC 120 is the same as the received source pixel rate of the digital source image 101. The corresponding analog image signal 121 is applied at one input of the selector 130, while the analog source image 102 is applied at another input of the selector 130. As such, the selector 130 is used to select the corresponding analog image signal 121 or the analog source image signal 102 to be a selected analog image 131. The selected analog image signal 131 is sent to the ADC 140. According to the present invention, the selected analog image signal 131 is sampled and digitized by the ADC 140 at a rate that is higher than the source image pixel rate of the source image signal 101 or 102. Therefore, the ADC 140 provides oversampled pixel data 141 where the number of active pixels per line is greater than the number of active pixels per line in the source image signal 101 or 102. Preferably, the number of active pixels per line provided by the ADC 140 is an integer multiple of the number of active pixels per line in the source image. As such, the sampling and conversion pixel rate of the ADC 140 during active portion of the image is preferably an integer multiple of the pixel rate of its source image signal 101 or 102. Using an integer multiple provides coherent sampling to help avoid aliasing artifacts in the sampled image.

Figure 4:
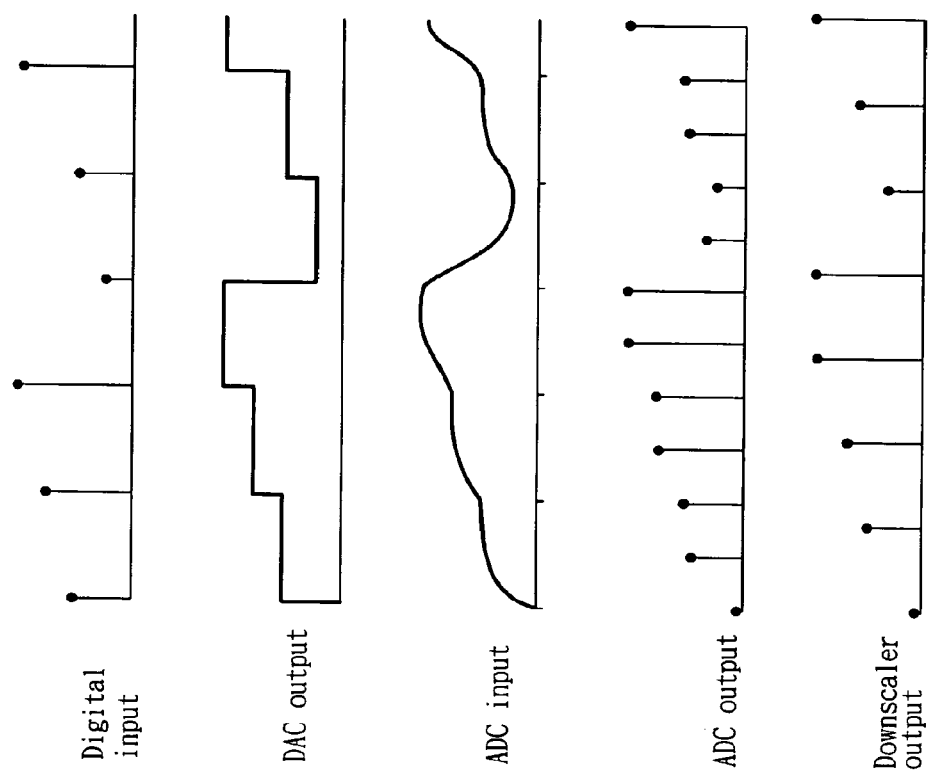
FIG. 4 depicts various waveforms at the associated outputs of FIG. 1.

The oversampled pixel data 141 are thereafter processed by the scalers 150 and 170 to be horizontally scaled down and vertically scaled up or down to fit the specified pixel resolution of a destination image. FIG. 4 illustrates the waveforms at various outputs incorporated herein for reference.

As an example, the pixel resolution of a source image is XGA, 1024×768 pixels, and the desired pixel resolution of the destination image is SXGA, 1280×1024 pixels. Note that the example should not be construed to limit the scope of the present invention. Some parameters of XGA and SXGA modes are provided as follows.

Input image:
 input refresh rate/frame rate: 60 Hz
 input active lines per frame: 768
 input active pixels per line: 1024
 input total lines per frame: 806
 input total pixels per line: 1344
 input pixel rate: 65 MHz
Output image:
 output refresh rate/frame rate: 60 Hz
 output active lines per frame: 1024
 output active pixels per line: 1280
 output total lines per frame: 1072
 output total pixels per line: 2098
 output pixel rate: 135 MHz Assuming that the input image is received in analog form, a clock is generated for the ADC 140 such that the ADC 140 digitizes the input image signal 102 at a rate of 2-times the input pixel rate, 2*65 MHz=130 MHz. The oversampled pixel data 141 at the output of the ADC 140 will have the following characteristics:

Oversampled pixel data 141:
 oversampled refresh rate/frame rate: 60 Hz
 oversampled active lines per frame: 768
 oversampled active pixels per line: 2048
 oversampled total lines per frame: 806
 oversampled total pixels per line: 2688
 oversampled pixel rate: 130 MHz The oversampled pixel data 141 are first provided to the horizontal down-scaler 150, which downscales the image in the horizontal direction from 2048 active pixels per line to 1280 active pixels per line. The horizontally downscaled image data are provided to a buffer memory 160 that stores the active pixel data. The output pixel data of the buffer memory 160 are provided to the vertical scaler 170, which interpolates and upscales the image in the vertical direction such that the number of active lines per output image frame is greater than the number of active lines per input image frame. In this example, the image is upscaled in the vertical direction from 768 active lines per frame to 1024 active lines per frame. The output of the vertical upscaling may undergo other processing, and then is provided to the display device at an output clock rate.

The output clock rate and total pixels per line are set in such a way so the destination image can be created without overflowing or underflowing the buffer memory 160, and that the output image frame can be generated at the average same rate as the input image frame rate.

Figure 8B:
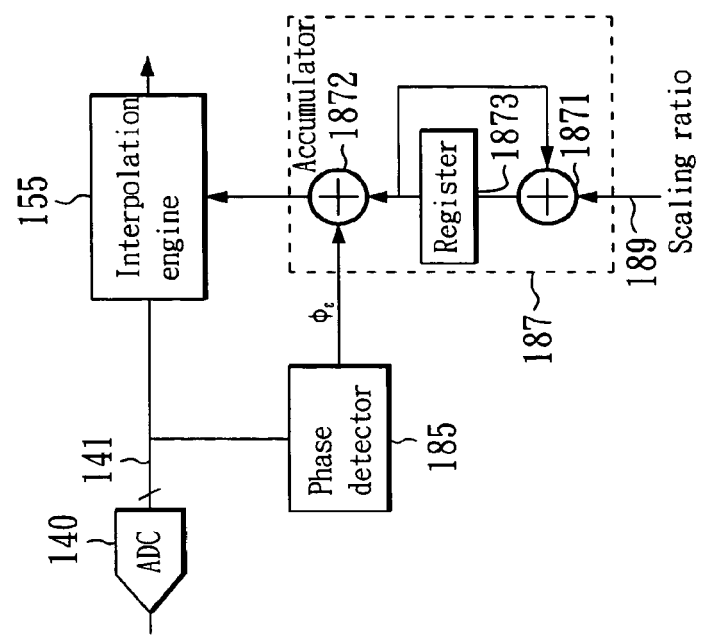
FIGS. 8a and 8b schematically depict the diagram of phase detection in accordance with the present invention.
Figure 8A:
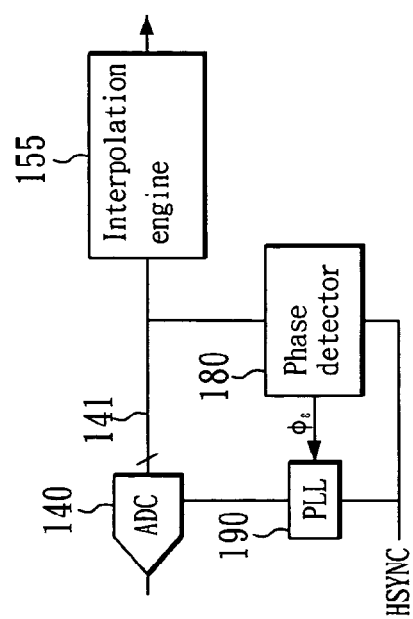

The oversampled pixel data 141 can be provided to a phase detector 180 which can process the image pixel data 141 to obtain phase error information for an ADC clock generator (e.g., a phase locked loop 190, as shown in FIG. 8a) to enhance the phase tracking performance of the input sampling relative to the input image signal 101 or 102. Such a phase error feed-back method can be especially effective when the input image contains significant horizontal high frequency information. A phase error feed-forward method is shown in FIG. 8b, where the pixel data 141 is provided to a phase detector 185 which can derive the phase error information($\Phi\epsilon$) from the oversampled pixel data 141. The accumulator 187 uses the phase error information and the scaling ratio information 189 to generate the index signal for interpolation engine 155. The accumulator 187 comprises first adder 1871, second adder 1872 and a register 1873. As shown in FIG. 8b, the first adder 1871 is connected to the register 1873 and an input end for receiving the scaling ratio 189. The input ends of the second adder 1872 are connected to said register 1873 and the output of said phase detector 185, the output end of the second adder 1872 is then connected to the interpolation engine 155. The index signal corresponds to the output pixel position relative to the input pixel position for the interpolation of each output pixel. It is used to calculate or lookup the interpolation coefficients.

Figure 2:
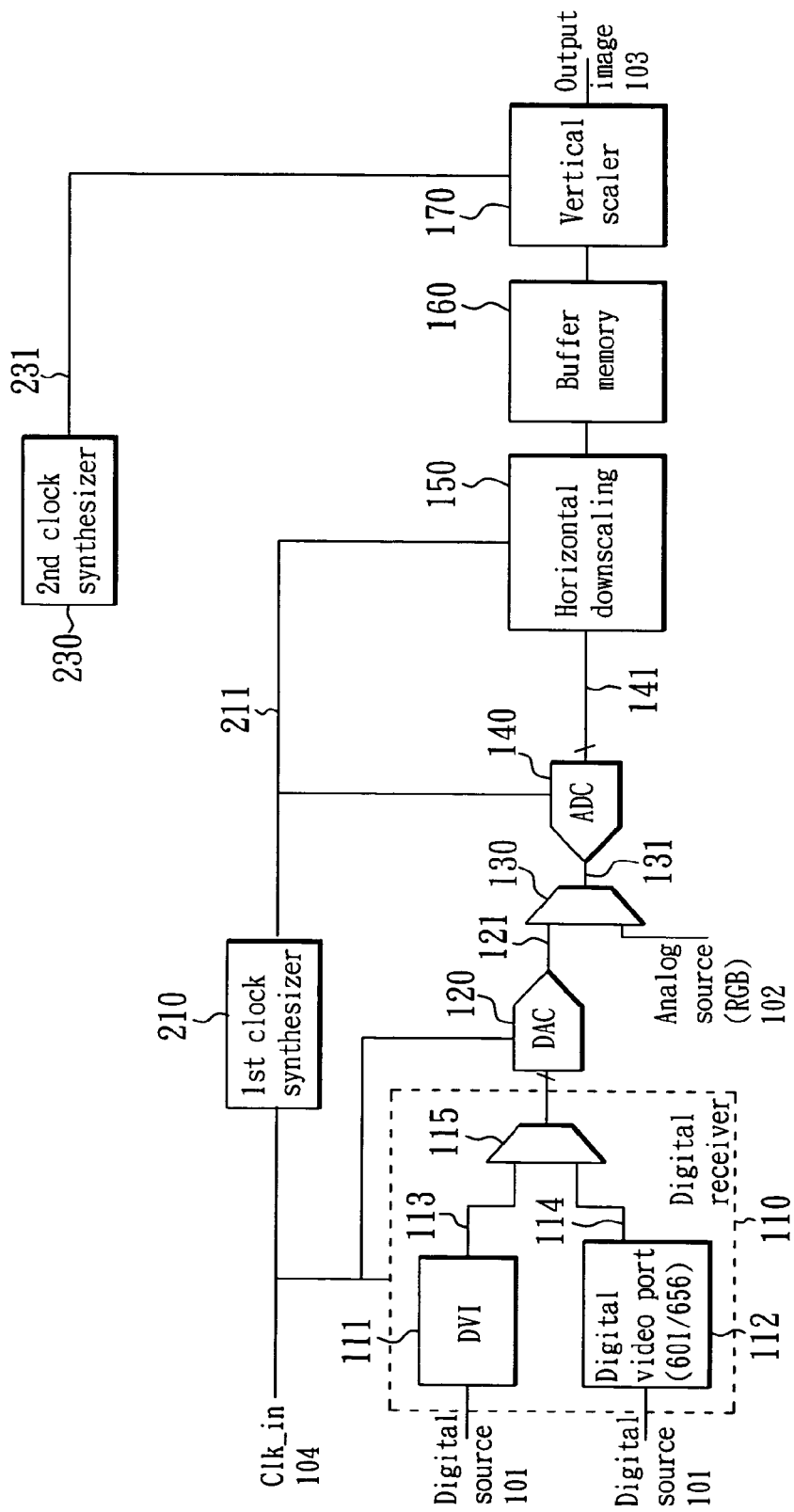
FIG. 2 schematically depicts one example of clock circuitry used for processing digital input images in accordance with the present invention.
Figure 3:
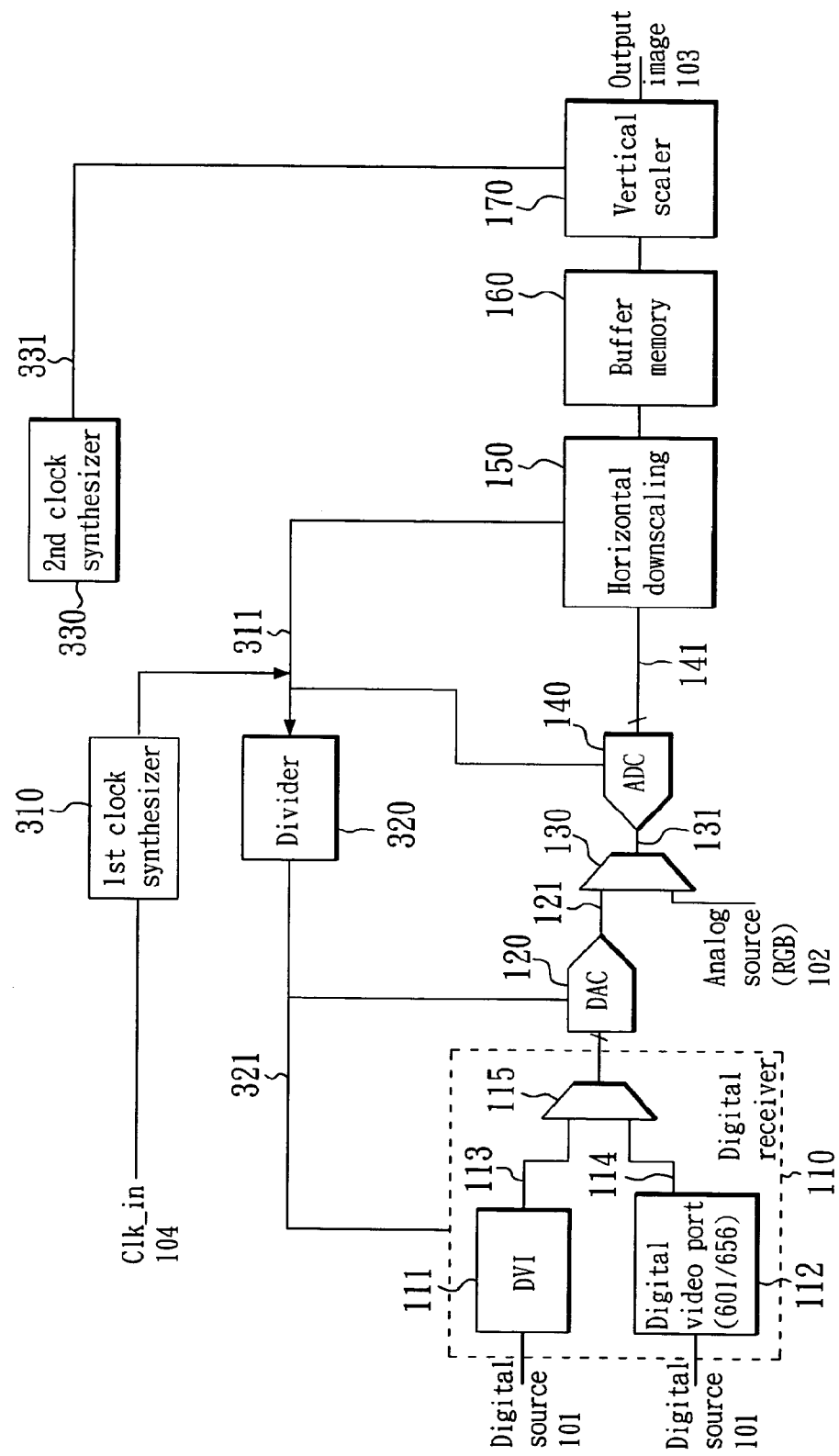
FIG. 3 schematically depicts another example of clock circuitry used for processing digital input images in accordance with the present invention.

If the input image is received in digital form, an input clock Clk_in 104 is transmitted along with the digital input image signal 101 and used to generate an oversampling clock for the ADC 140 as shown in FIGS. 2 and 3. Referring to FIG. 2, the first clock synthesizer 210 is used to generate the oversampling clock 211 having a frequency F_adc that is an integer multiple of the frequency F_in of the input clock Clk_in 104. The oversampling clock 211 is applied to the ADC 140 and the horizontal down-scaler 150 while the digital receiver 110 and the DAC 120 are clocked in response to the input clock Clk_in 104 directly. In FIG. 2, the second clock synthesizer 230 is provided to generate an output clock 231 for the vertical scaler 170.

Referring to FIG. 3, the first clock synthesizer 310 is used to generate the oversampling clock 311 having a frequency F_adc that is an integer multiple of the frequency F_in of the input clock Clk_in 104. A divider 320 is provided to generate a clock 321 having the frequency F_in by means of dividing the frequency F_adc of the oversampling clock 311 by the same integer multiple. The oversampling clock 311 is applied to the ADC 140 and the horizontal down-scaler 150 while the digital receiver 110 and the DAC 120 are clocked in response to the clock 321. In FIG. 3, the second clock synthesizer 330 is provided to generate an output clock 331 for the vertical scaler 170.

Figure 5:
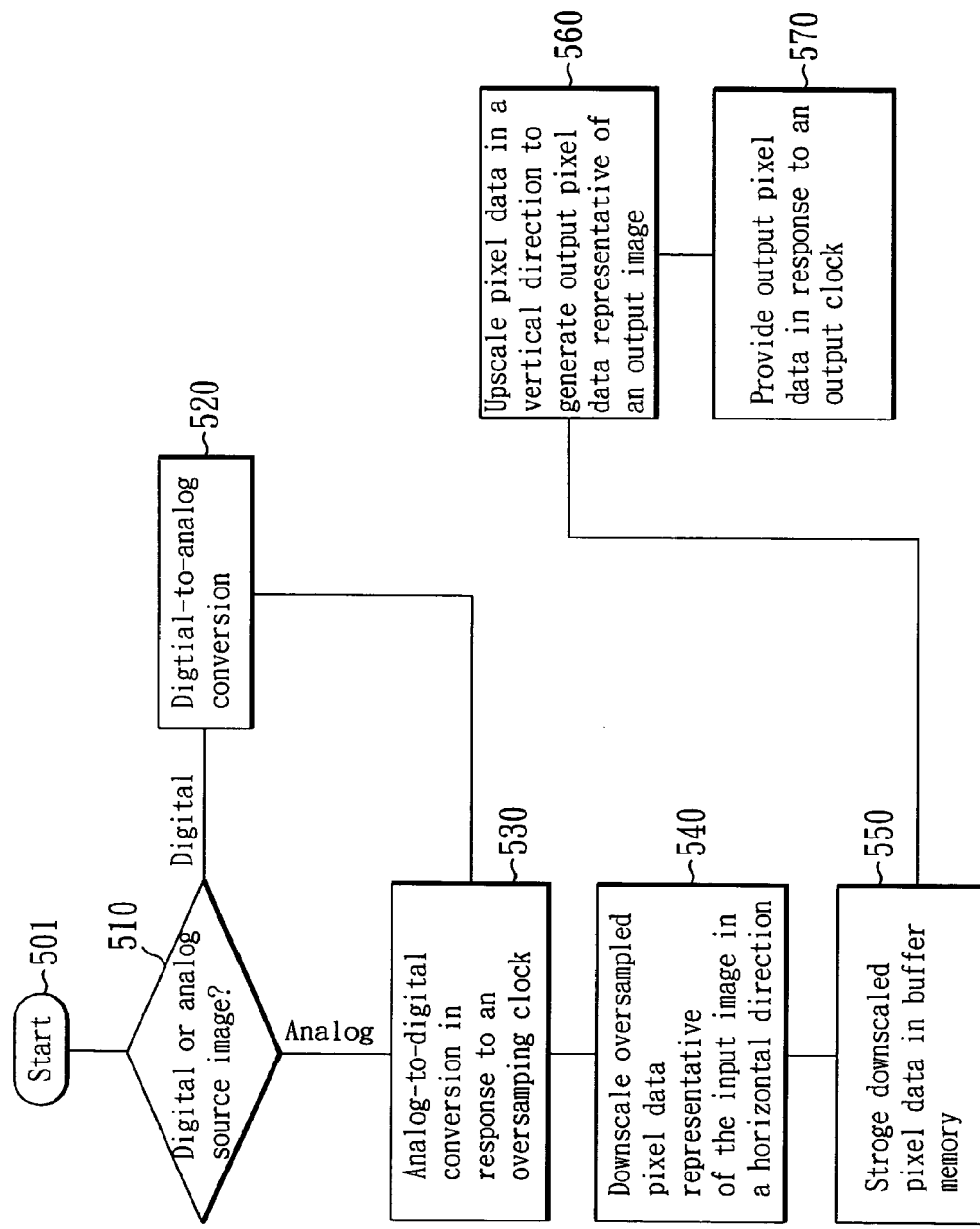
FIG. 5 depicts a flow chart in accordance with the method of the present invention.
Figure 6:
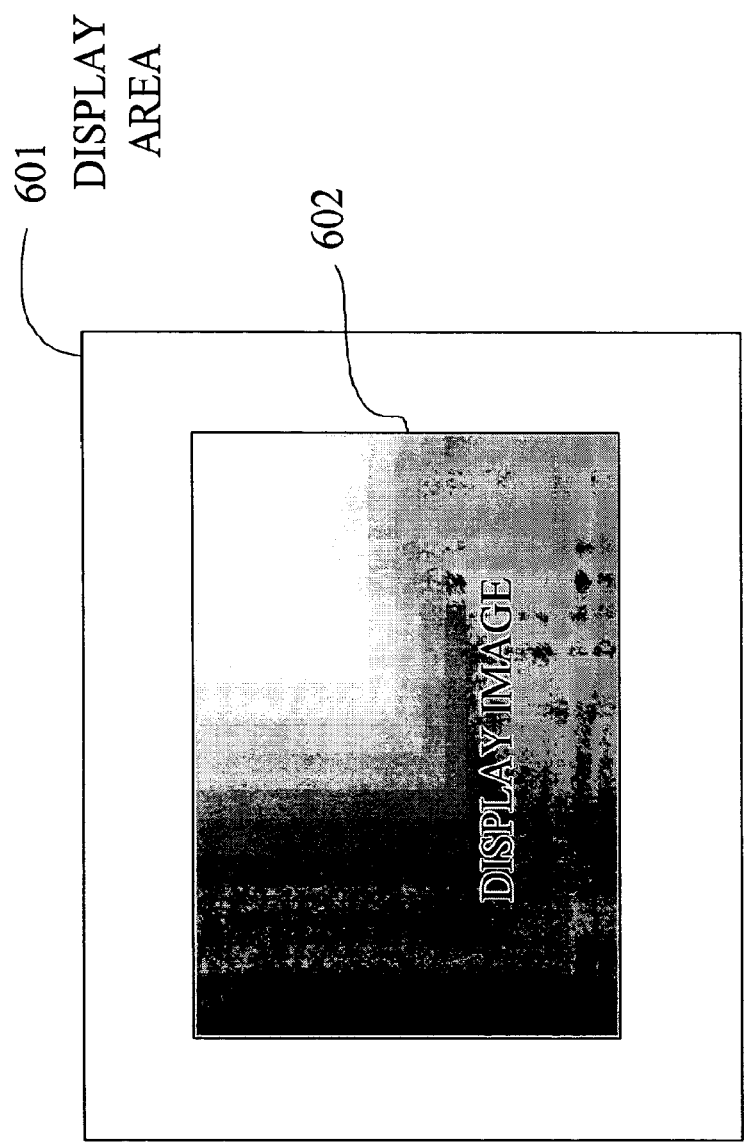
FIG. 6 depicts a diagram for the display panel and the original input image.
Figure 7A:
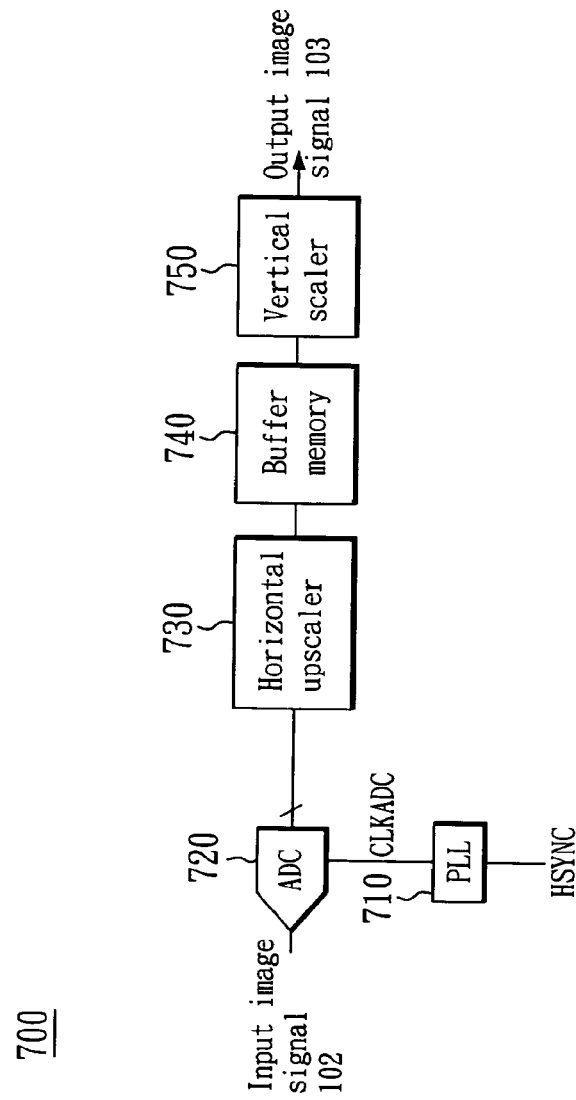
FIGS. 7a and 7b depict schematic diagrams of a prior art related to the present invention.
Figure 7B:
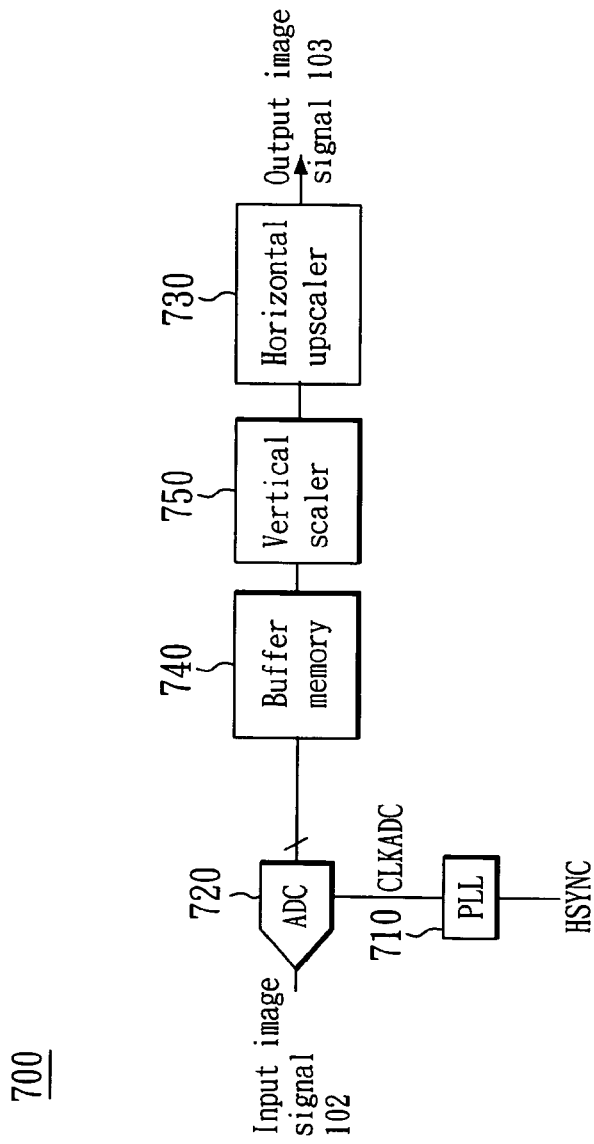

FIG. 5 is a flow chart illustrating a method of the present invention. In step 510, the input image is determined to be analog or digital. If the input image is found in digital form, the digital input image signal 101 is converted by the DAC 120 into the corresponding analog image signal 121 in step 520 and the method proceeds to step 530. If the input image is received in analog form, the method proceeds to step 530.

In step 530, the corresponding analog image signal 121 or the analog input image signal 102 is converted by the ADC 140 into oversampled pixel data 141 at an oversampling rate.

In step 540, the oversampled pixel data 141 are provided to the horizontal down-scaler 150 which downscales the oversampled pixel data 141 in the horizontal direction from greater active pixels per line to fewer active pixels per line in order to fit the resolution of the destination image.

In step 550, the downscaled pixel data are stored in the buffer memory 160 that stores one or more lines of pixel data. The pixel data 141 are horizontally downscaled prior to the buffer memory 160 so as to reduce the required memory size. However that is not necessary to store the downscaled pixel data into buffer memory in this step according to this invention. In another embodiment, the oversampled pixel data could be stored into buffer memory first and then downscaled.

In step 560, the stored pixel data of the buffer memory 160 are provided to the vertical scaler 170, which interpolates and upscales the image in the vertical direction such that the number of active lines per output image frame is greater than the number of active lines per input image frame.

In step 570, the output pixel data representative of the output image is provided by the vertical scaler 170 to the display device at the output clock rate.

In summary, an image is adjusted by sampling an analog signal representative of the image at a higher frequency than the pixel rate of the original image, then downscaling in the digital domain to the desired image resolution. In the preferred method, sampling of the analog signal is performed at a frequency that is an integer multiple of the input pixel rate, thus avoiding some of the pitfalls of directly sampling the input signal at the desired image resolution. Likewise, when the image is received in digital form, it is first converted to an analog signal using a digital to analog converter, then the resulting analog signal is sampled and digitized using an analog to digital converter at a frequency that is higher than the pixel rate of the received image, thus performing the upscaling first in the analog domain, then digitally downscaling to the desired horizontal resolution of the output image. The scaled image is then stored in a buffer memory and subsequently scaled up or down as desired in the vertical direction. Such vertical scaling methods could be simply duplicating previous line pixels data or using other interpolation methods to generate one or several new line pixels data for upscaling; and could be simply deleting a line pixels data or using other interpolation methods to reduce the line pixels data for downscaling. Source image is transmitted in analog or digital format from a computer or video source.

While the present invention has been described with reference to the preferred embodiments thereof, it is to be understood that the invention should not be considered as limited thereby. Various modifications and changes could be conceived of by those skilled in the art without departure from the scope of the present invention, which is indicated by the appended claims.

What is claimed is:

1. An apparatus for adjusting an input image to generate an output image, comprising:
    an analog receiving port for receiving said input image in the form of an analog signal;

an analog-to-digital converter for converting said analog signal to generate horizontal pixel data, the analog-to-digital converter performs high speed sampling and converting;

a horizontal interpolator for adjusting said horizontal pixel data to generate the adjusted horizontal pixel data using phase error signal, wherein the phase error signal is generated by a phase detector;

a buffer memory for storing said adjusted horizontal pixel data; and a vertical scaler for upscaling said adjusted horizontal pixel data in a vertical direction so as to generate output pixel data representative of said output image using an output pixel clock.

2. The apparatus as claimed in claim 1, further comprising a clock generator for generating a sampling clock and providing the sampling clock to said analog-to-digital converter.

3. The apparatus as claimed in claim 2, wherein said sampling clock is an integer multiple of the pixel rate of the input image signal.

4. The apparatus as claimed in claim 2, wherein the rate of sampling clock is similar to the output pixel clock.

5. The apparatus as claimed in claim 1, wherein said buffer memory is a line buffer for storing said adjusted horizontal pixel data.

6. The apparatus as claimed in claim 2, wherein said clock generator further comprising a phase detector for detecting the sampling phase error between said sampling clock and said input image signal using said pixel data, and feeding back the phase error to said clock generator to adjust the phase of said sampling clock.

7. The apparatus as claimed in claim 1, wherein said horizontal interpolator further comprising an accumulator for generating an index signal for interpolating the pixel data using said phase error signal.

8. The apparatus as claimed in claim 7, wherein said accumulator using said phase error signal and a scaling ratio signal to generate said index signal.

9. The apparatus as claimed in claim 1, wherein said input image signal is complying with the VESA format, a computer graphic format.

* * * * *